US009139302B2

United States Patent
Dehn et al.

(10) Patent No.: US 9,139,302 B2
(45) Date of Patent: Sep. 22, 2015

(54) HAND DRYING DEVICE AND WASHING STAND FOR AN AIRCRAFT

(75) Inventors: Martin Dehn, Aumuehle (DE); Andrew Muin, Harsefeld (DE); Jan Reh, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 793 days.

(21) Appl. No.: 13/370,818

(22) Filed: Feb. 10, 2012

(65) Prior Publication Data

US 2012/0210509 A1 Aug. 23, 2012

Related U.S. Application Data

(60) Provisional application No. 61/441,514, filed on Feb. 10, 2011.

(30) Foreign Application Priority Data

Feb. 10, 2011 (DE) .......................... 10 2011 010 913

(51) Int. Cl.
*B64D 11/02* (2006.01)
*B64D 11/04* (2006.01)

(52) U.S. Cl.
CPC ........................................ *B64D 11/02* (2013.01)

(58) Field of Classification Search
CPC ....................................................... B64D 11/02
USPC ............... 244/118.5; 34/202, 572; 4/623, 638
See application file for complete search history.

(56) References Cited

U.S. PATENT DOCUMENTS

| | | | |
|---|---|---|---|
| 1,765,915 A | 6/1930 | Haase | |
| 3,060,472 A | 10/1962 | Horton | |
| 4,144,596 A | 3/1979 | MacFarlane et al. | |
| 4,145,769 A | 3/1979 | MacFarlane et al. | |
| 4,398,310 A * | 8/1983 | Lienhard | 4/623 |
| 5,522,411 A | 6/1996 | Johnson | |
| 5,727,579 A | 3/1998 | Chardack | |
| 5,860,437 A | 1/1999 | Fernie | |
| 5,924,148 A | 7/1999 | Flowers, Sr. | |
| 7,856,736 B2 | 12/2010 | Churchill et al. | |
| 2002/0109046 A1* | 8/2002 | Ooi et al. | 244/118.5 |
| 2004/0227034 A1* | 11/2004 | Wentland et al. | 244/119 |
| 2011/0240796 A1* | 10/2011 | Schneider | 244/118.5 |
| 2012/0032027 A1* | 2/2012 | Gehm et al. | 244/118.5 |

FOREIGN PATENT DOCUMENTS

| | | |
|---|---|---|
| AU | 2001201218 A1 | 4/2004 |
| BE | 1003397 A6 | 3/1992 |
| CA | 445410 A | 9/1947 |
| CN | 2140699 Y | 8/1993 |

(Continued)

OTHER PUBLICATIONS

German Patent Office, German Search Report dated Dec. 23, 2011 for German Patent Application No. 10 2011 010 913.7.

*Primary Examiner* — Rob Swiatek
(74) *Attorney, Agent, or Firm* — Ingrassia Fisher & Lorenz P.C.

(57) ABSTRACT

A hand-drying device for an aircraft can be integrated into a washing stand, so that the hand washing and hand drying process can be performed within the washbasin of the washing stand. Corresponding sensors make this process contactless.

13 Claims, 5 Drawing Sheets

(56) References Cited

FOREIGN PATENT DOCUMENTS

| | | | |
|---|---|---|---|
| CN | 2161233 Y | 4/1994 | |
| CN | 2168528 Y | 6/1994 | |
| CN | 2189168 Y | 2/1995 | |
| CN | 2216804 Y | 1/1996 | |
| CN | 2239222 Y | 11/1996 | |
| CN | 2662851 Y | 12/2004 | |
| CN | 201320302 Y | 10/2009 | |
| DE | 102009018690 A1 | 10/2010 | |
| DE | 102009021970 A1 | 11/2010 | |
| EP | 0 289 300 A2 * | 11/1988 | ............. B64D 13/00 |
| GB | 2173697 Y | 10/1986 | |
| GB | 9612114 | 6/1996 | |
| JP | 61193617 A | 8/1986 | |
| JP | 62106729 A | 5/1987 | |
| JP | 62106730 A | 5/1987 | |
| JP | 62106731 A | 5/1987 | |
| JP | 62106732 A | 5/1987 | |
| JP | 62211030 A | 9/1987 | |
| JP | 62211031 A | 9/1987 | |
| JP | 62217927 A | 9/1987 | |
| JP | 62233124 A | 10/1987 | |
| JP | 62233125 A | 10/1987 | |
| JP | 62243519 A | 10/1987 | |
| JP | 62258624 A | 11/1987 | |
| JP | 2000060763 A | 2/2000 | |
| JP | 2000262433 A | 9/2000 | |
| JP | 2001137150 A | 5/2001 | |
| JP | 2002088865 A | 3/2002 | |
| JP | 2002115303 A | 4/2002 | |
| JP | 2003275112 A | 9/2003 | |
| JP | 2006255226 A | 9/2006 | |
| JP | 2006255232 A | 9/2006 | |
| JP | 2006255233 A | 9/2006 | |
| KR | 20040085873 A | 10/2004 | |
| KR | 200440107817 A | 12/2004 | |
| KR | 20050000283 A | 1/2005 | |
| KR | 200425399 Y1 | 9/2006 | |
| KR | 100737990 B1 | 7/2007 | |
| WO | 9745049 A1 | 12/1997 | |
| WO | 9966138 A1 | 12/1999 | |
| WO | 2006058374 A1 | 6/2006 | |
| WO | 2007080363 A1 | 7/2007 | |
| WO | 2010121862 A1 | 10/2010 | |

\* cited by examiner

HAND DRYING DEVICE AND WASHING STAND FOR AN AIRCRAFT

CROSS-REFERENCE TO RELATED APPLICATIONS

This application claims priority to the German Patent Application No. 10 2011 010 913.7 filed Feb. 10, 2011 and claims priority to U.S. Provisional Patent Application No. 61/441,514 filed Feb. 10, 2011, the disclosures of which applications are hereby incorporated herein by reference.

TECHNICAL FIELD

The technical field relates to devices involving the interior fixtures of toilet modules or kitchens in passenger aircraft. In particular, the technical field relates to a hand-drying device for an aircraft, a washing stand with a hand-drying device, an aircraft toilet module, an aircraft kitchen module, as well as an aircraft with a hand-drying device or a washing stand.

BACKGROUND

Hand washing basins, in which the passengers and flight personnel can wash their hands, are installed in aircraft cabins, in particular, in aircraft toilet modules or kitchen modules (galleys) installed therein. Tissues are provided for drying the hands, which can be taken from a dispenser located near the hand-washing basin. The used tissues are collected in a waste container.

Both the fresh tissues and used tissues must be stored. In addition, it should be ensured that enough fresh tissues are available at all times. A corresponding supply may have to be kept in stock for this purpose, and the dispensing devices for dispensing the tissues should be refilled regularly. This may be associated with the need for more space, a higher weight, and additional costs.

DE 10 2009 018 690 A1 and WO 2010/121862 A4 describe aircraft toilet modules with a hand washing basin. DE 10 2009 021 970 A1 describes an autonomous water module for aircraft, which also exhibits a hand washing basin.

SUMMARY

A hand-drying device is provided for an aircraft, a washing stand, an aircraft toilet module, an aircraft kitchen module, and an aircraft. Further embodiments may be gleaned from the following summary and detailed description.

A first embodiment indicates a hand-drying device for an aircraft, which is designed for generating a stream of air to dry the hands of a user. The hand-drying device is here designed for connection to an air supply line of the aircraft, through which at least a portion of the air needed for operating the hand-drying device can be provided. Therefore, the hand drying device exhibits a blower, for example, which generates and emits the essentially dry and, if necessary, heated stream of air, which can then be used to dry the hands of the user.

The hand-drying device is connected to an air supply line of the aircraft, and taps at least a portion of the air to be blown out from this air supply line. For example, already heated and compressed air is delivered via this air supply line, so that the air inside the hand drying device need only be additionally compressed to a comparatively slight extent, if at all. It is also possible that the air inside the hand-drying device will not have to be heated any further, since the air made available by the air supply line is already sufficiently heated. For example, this air supply line may involve a line that carries bleed air from one or more aircraft engines. A line of the air conditioning system can also be involved here, which carries air provided by the air conditioner of the aircraft.

In an embodiment, the hand-drying device exhibits a compressor for recompressing the air provided by the air supply line of the aircraft. For example, this compressor can be a volume compressor or pump. This compressor can have a very efficient design. Such a design provides that the generated air stream is blown out of the hand drying device at a comparatively high speed measuring up to several hundred kilometers per hour, e.g., approximately 300 or approximately 400 kilometers per hour, allowing the hand drying process to conclude within a few seconds, for example, within approximately ten seconds.

In a further embodiment, the hand-drying device exhibits another air supply for providing additional air. This additional air may be mixed in with the air provided by the air supply line of the aircraft within the hand-drying device. Depending on the quantity and pressure of the air provided by the air supply line, a valve may be furnished and used to regulate the additional air supply accordingly. In so doing, it may be ensured that the optional quantity of incoming air is always made available to the hand-drying device, and furthermore that more air than needed is not removed from the cabin.

Another embodiment is a washing stand for an aircraft, comprising a hand-washing basin and a hand-drying device designed for generating an air stream to dry the hands of a user. The hand-drying device exhibits several air outlets, which are integrated into the hand-washing basin, and through which the air stream for drying the hands of the user is blown out. The washing stand may also comprise a hand-drying device previously described also described subsequently. For example, this washing stand may be an autonomous water module as described in DE 10 2009 021 970 A1, or a washing stand permanently installed in the cabin or a corresponding monument. For example, the washing stand is a module for an onboard kitchen or a module for an aircraft toilet.

This washing stand exhibits an interface, which is designed for connection to a corresponding interface of the air supply line in the aircraft. In the case of an autonomous water module, this interface may be designed as a manually detachable connection that is easy to operate, so that the washing stand can be shifted within the aircraft cabin without any great effort.

In another embodiment, the hand drying device exhibits several air outlets, which are integrated into the hand washing basin, and through which the air stream for drying the hands of the user is blown out. In other words, the user can thus wash his or her hands in the hand-washing basin, and immediately or soon thereafter dry them in the air stream without having to remove his or her hands from the washing basin for this purpose. Therefore, the blown off water may collect in the washing basin, and then be routed to a gray water storage tank.

In another embodiment, at least two of the air outlets are situated across from each other, so that two or more streams of air flowing in opposite directions can be generated. For example, these air streams are flat, high-speed air streams, which are generated slightly vertically offset from each other, so as not to impede each other to any significant extent.

In another embodiment, the washing stand exhibits a first optical sensor and/or a second optical sensor. The first optical sensor records when the hand of the user is located in a first position provided for this purpose (e.g., under a water tap of the washing stand). The first optical sensor thereupon activates the flow of water out of this water tap. The second optical sensor records when the hand of the user is located in a second position provided for this purpose, e.g., near the air outlets. In this case, the second optical sensor activates the hand-drying device. It may also be possible to only provide the first optical sensor, and for the water to only run for a definite period of time, for example until the user removes his or her hand from the location provided for hand washing, after which the hand drying device is automatically activated.

In another embodiment, the washing stand is designed for completely contactless use. The user may not have to touch any fittings, buttons or adjusting levers to carry out the washing routine. In particular, an automated soap dispenser may also be provided, e.g., which also exhibits an optical sensor, so that soap is dispensed when the user holds his or her hand under this soap dispenser. In particular, the soap dispenser may be positioned in such a way as to dispense the soap over the washing basin, so that excess soap drips into the basin.

Furthermore, an automated dispenser for dispensing a sterilizing or sanitary agent onto the user's hands may be provided as part of the washing stand. The agent may be sprayed onto the user's hands. The dispenser may also comprise one or more sensors, so that the agent is dispensed when the user holds his or her hand under this agent dispenser. In particular, the agent dispenser may be positioned in such a way as to dispense the agent over the washing basin, so that excess agent drips into the basin.

The ability to use the hand-washing basin completely without contact may make it possible to improve hygiene. In addition to the sensors, corresponding adjusting levers and/or buttons can be furnished to ensure that the washing basin remains operable even if a sensor fails.

Another embodiment provides an aircraft toilet module, which exhibits a hand-drying device described above and below and/or a washing stand previously described and described subsequently. For example, the hand-drying device or washing stand may be connected with the toilet, thereby providing a combined toilet bowl-washing stand module.

Another embodiment provides an aircraft kitchen module, which exhibits a hand-drying device described above and below and/or a washing stand previously described and described subsequently. Another provides an aircraft, which exhibits a hand-drying device described above and below and/or a washing stand previously described and described subsequently. In yet another embodiment, at least a portion of the air provided by the air supply line to the hand-drying device is bleed air from an engine of the aircraft and/or air from an aircraft air conditioning system.

In another embodiment, at least a portion of the air provided by the air supply line to the hand-drying device is air having a higher pressure than the cabin air of the aircraft and/or a higher temperature than the cabin air of the aircraft. Apart from the above, let it be noted that the hand-drying device may also exhibit a heater in order to heat up the air to be blown out.

According to another embodiment, the aircraft may further comprise a lighting arrangement for emitting light of different colors. The lighting arrangement is adapted for emitting light of a first color only when rinsing water is ejected from the washing stand and wherein the lighting arrangement is adapted for emitting light of a second color only when the hand-drying device is activated. The lighting arrangement may furthermore be adapted for emitting light of a third color only when soap is ejected and light of a fourth color only when a sanitary/sterilizing agent is dispensed. Thus, the user may be guided such that it is clear to him/her step is to be performed at which time.

Further exemplary embodiments are described below drawing reference to the figures.

BRIEF DESCRIPTION OF THE DRAWINGS

The embodiments will hereinafter be described in conjunction with the following drawing figures, where like numerals denote like elements and the depictions on the figures are diagrammatic and not to scale, and.

DETAILED DESCRIPTION

The following detailed description is merely exemplary in nature and not intended to limit application and uses. Furthermore, there is no intention to be bound by any theory presented in the preceding background or summary or the following detailed description.

Figure 1:
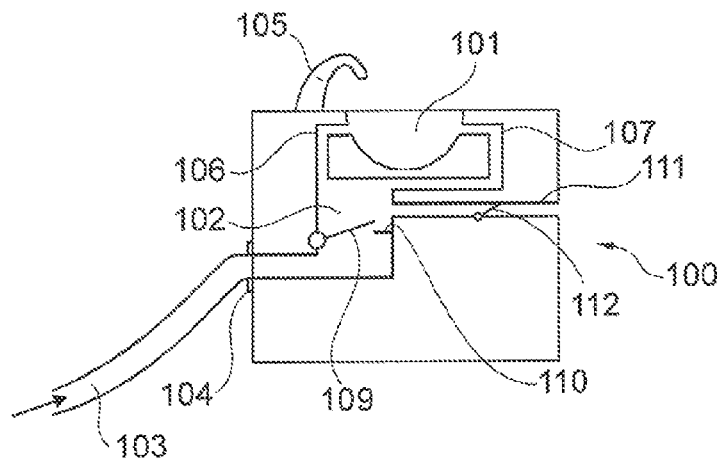
FIG. 1 shows a washing stand 100 according to an exemplary embodiment.

FIG. 1 shows a washing stand 100 according to a first exemplary embodiment. The washing stand 100 exhibits a hand washing basin 101, over which the water outlet of a water tap 105 is situated, so that a user can wash his or her hands over or in the hand-washing basin 101. Also provided is a hand drying device 102 hooked up to an air supply line 103 of the aircraft via the interface 104 arranged on the rear side of the washing stand 100. For example, hot bleed air or air of the air conditioning system is carried by this air supply line 103, and delivered to the hand-drying device 102 as needed. To this end, for example, the hand-drying device exhibits a valve 109, e.g., one that is designed like a flap, and exhibits a stop 110, which prevents air from being carried from the hand-drying device 102 back into the air supply line 103.

A compressor, which is not shown in FIG. 1, additionally compresses the provided air can be furnished within the hand-drying device 102. Furthermore, another air supply 111 can be furnished, which can provide the hand-drying device with additional air from the environment of the washing stand 100. This air supply can also be controlled by way of a corresponding valve 112. The two lines 106, 107 are furnished to deliver the compressed air, guiding the compressed and if necessary heated air from the compressor to air nozzles or air slits integrated into the hand-washing basin 101 at opposing locations, through which the air is then blown out.

Figure 2:
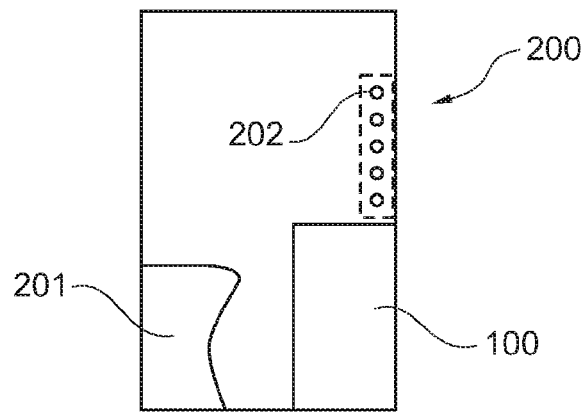
FIG. 2 shows an aircraft toilet module according to another exemplary embodiment.

FIG. 2 shows an aircraft toilet module 200, which incorporates a toilet bowl 201 and a washing stand 100. Distinct, separate fixtures were previously installed in aircraft toilet modules and aircraft kitchen modules for washing and drying hands: A water tap with washbasin, a tissue dispenser, and a waste container. The disadvantage to this configuration on the one hand is that more space is needed for the different fixtures, which is associated with extra weight. In addition, the tissues should be routinely refilled, for example after each flight.

The process of cleaning the hands requires numerous operations to be performed in sequence. The water tap must first be activated, and the soap dispenser operated. The washing process then takes place, after which drying material (e.g., tissue) is provided from the dispenser furnished for this purpose, and the used tissues are thrown into the waste container. Each of the actions takes a certain amount of time, and further requires that users orient themselves as to where and how to perform the hand movements needed. Under certain conditions, for example in the event of great fatigue or in cases of nausea, this may place an excessive burden on the passenger, rendering them unable to operate the different fixtures.

In particular, when combined with a washing stand and using a hand-drying device described above and below in an aircraft, yields a variety of advantages. For example, this may make washing and drying the hands a more hygienic, faster, intuitive, and hence simpler process for the passenger. It also enables a seamless hand cleaning process, even under more difficult circumstances.

An advantage to the airlines has to do with reduced costs, since tissues need no longer be taken along for drying hands. This may make it possible to save on procurement, inventory, transportation, refilling, and disposal costs. In addition, this may yield a reduced weight, since tissues no longer have to be carried. No extra tissue dispensers, waste containers, and storage areas have to be provided either, so that space may be economized in addition to weight and costs. Furthermore, a lighting arrangement 202 is provided which comprises one or more lights, for example LEDs, for emitting light of different colors. The lighting arrangement is adapted for emitting light of a first color only when rinsing water is ejected from the washing stand and for emitting light of a second color only when the hand-drying device 102 (see FIG. 1) is activated. Therefore, the combined washing stand may make it possible to simplify and optimize the hand cleaning process by combining devices for dispensing water, dispensing soap, and drying (e.g., air jet) with each other.

Figure 3:
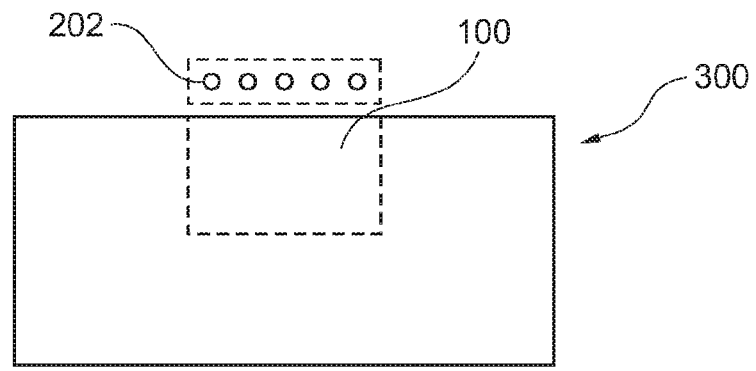
FIG. 3 shows a kitchen module according to another exemplary embodiment.

Naturally, the washing stand may also be integrated into an onboard kitchen module, as shown diagrammatically on FIG. 3. The washing stand 100 is here pushed into a corresponding recess in the aircraft kitchen module 300 from above, and on its rear side is hooked up to an air supply line of the aircraft. Above the washing stand, a lighting arrangement 202 is arranged.

Figure 4:
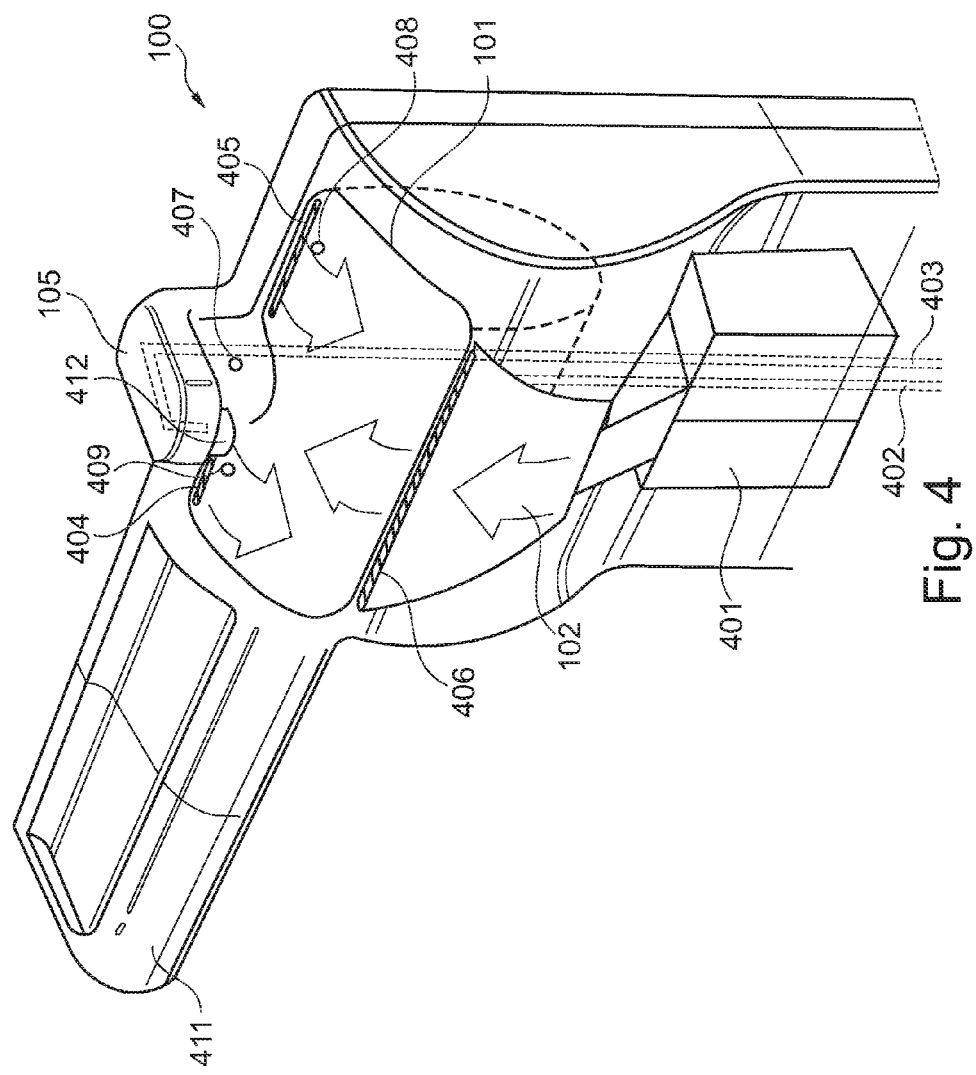
FIG. 4 shows a washing stand according to another exemplary embodiment.

FIG. 4 shows a perspective view of a washing stand 100 according to an exemplary embodiment. The hand-washing basin 101 is recessed in the washing stand 100, and the water tap 105 is situated over it. For example, an optical sensor 407 is provided in the base of the water tap, which records when a hand of the user is located under the water dispensing opening 412 of the water tap. In this case, the water is then automatically dispensed, for example for a specific interval of time. The fresh water is supplied from below via the right line 403, and the gray water accumulating in the hand-washing basin 101 is downwardly discharged via the left line 402.

The hand-drying device 102 is integrated into the washing stand. It exhibits an engine block (e.g., compressor) 401, which is used to compress the air to be blown out. For example, this engine block 401 is located under the hand-washing basin 101. The compressed air generated by the compressor is relayed to the outlet nozzles 404, 405 and 406. The nozzles 404 and 405 are situated to the left and right of the water tap on the one side of the hand-washing basin 101, and the third nozzle 406 is located on the opposite side of the hand-washing basin 101.

The nozzles are designed like slits, so that three flat airflows can be generated, as symbolized by the corresponding arrows. Situated under the nozzles is a respective optical sensor 408, 409, which records when the hand of the user is near the corresponding nozzle. In this case, the hand-drying device is activated, and the air streams are blown out, so that the user can dry both of his or her hands in a matter of a few seconds.

The fixtures, buttons, or levers do not have to be touched, since the hand-washing basin is completely automated, contactless, and sensor-controlled. For example, the optical sensors can be infrared sensors. The hand-washing basin 101 can be adjoined by a lateral table area 411, for example, which exhibits a trough, and can be used as a vanity. The lateral table can also adjoin the other side of the hand-washing basin, for example as depicted on FIG. 6.

Figure 5:
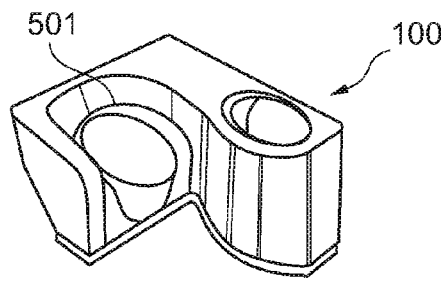
FIG. 5 shows the combination of washing stand and toilet according to another exemplary embodiment.

FIG. 5 shows the combination of a hand washing stand 100 and an aircraft toilet bowl 501. The toilet bowl 501 is here integrated into the washing stand 100.

Figure 6:
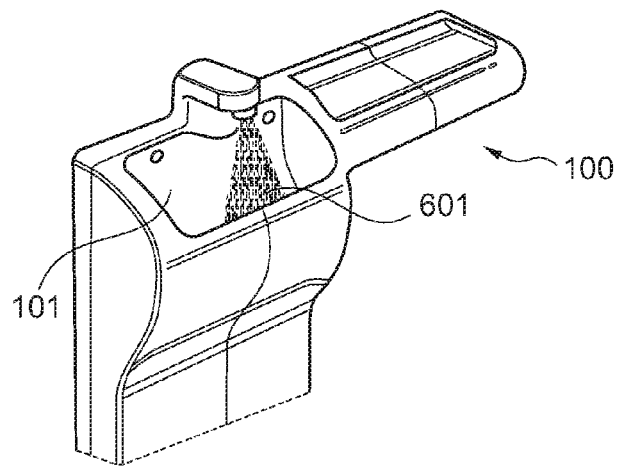
FIG. 6 shows a washing stand with running water tap according to an exemplary embodiment.

FIG. 6 shows a washing stand 100 with running water tap. The generated water jet 601 flows directly into the hand-washing basin 101, and is then discharged via the conduit 402 (see FIG. 4).

Figure 7:
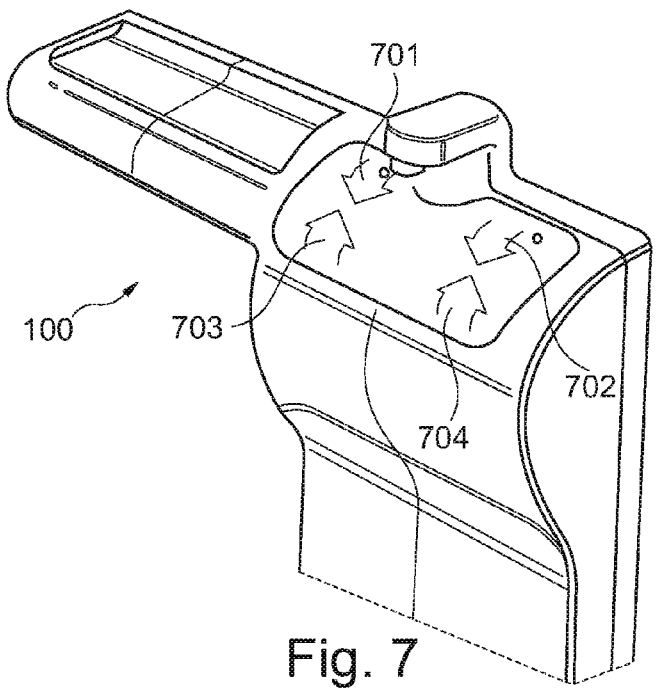
FIG. 7 shows a washing stand with activated hand drying device according to an exemplary embodiment.

FIG. 7 shows a hand-washing basin 101 with an activated hand-drying device, which in the case of FIG. 7 generates four air streams 701, 702, 703, and 704. The air streams consist of heated air, which flows out of four corresponding, slit-like air nozzles, of which two are located on one side of the hand washing basin, and two on the opposite side of the hand-washing basin.

Figure 8:
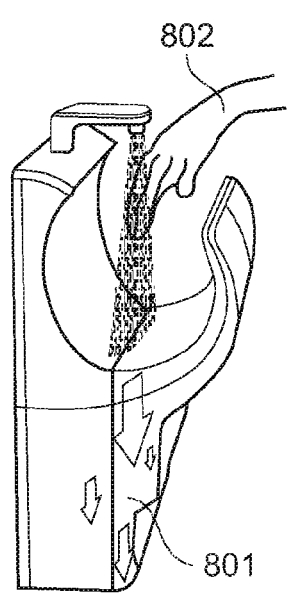
FIG. 8 shows a washing stand with running water tap according to an exemplary embodiment.

FIG. 8 shows a hand washing procedure, in which the user holds his or her hand 802 under the water tap, whereupon the water automatically begins to flow, collects in the lower region of the hand washing basin, and is then routed via the constriction 801 to the discharge line 402 (see FIG. 4).

Figure 9:
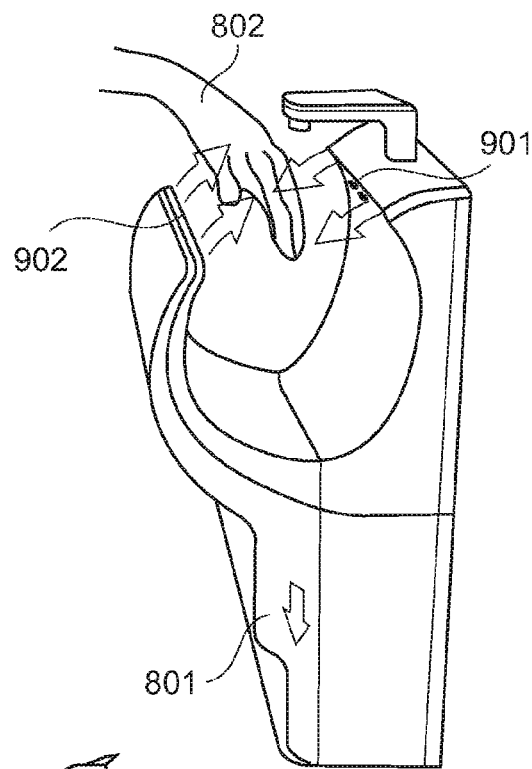
FIG. 9 shows a washing stand with activated hand drying device according to an exemplary embodiment.

FIG. 9 shows the hand washing basin of FIG. 8 with activated hand drying device. Visible in particular is how the opposite air streams inside the combined hand washing basin are carried upwardly from the compressor (not shown on FIG. 9), and then exit the opposing nozzles. The exiting, laminar, mutually opposite airflows are slightly vertically offset relative to each other, so as not to impede each other. Furthermore, an automated dispenser 1100 (see FIG. 11) for dispensing a sterilizing or sanitary agent onto the user's hands may be integrated into the hand washing basin. Next to the air stream nozzles openings 901, 902 may be provided for ejecting the sterilizing or sanitary agent onto the user's hands.

The curved design of the hand-washing basin 101 helps to assist the hand drying process, since the air streams coming from the side of the water tap on the opposite side of the hand washing basin are deflected downward, thereby describing a 360 degree turn, after which they can again be routed to the blown out air. By contrast, the air streams from the nozzles opposite the water tap are directed slightly upward, so that they cannot influence the other stream.

Figure 10:
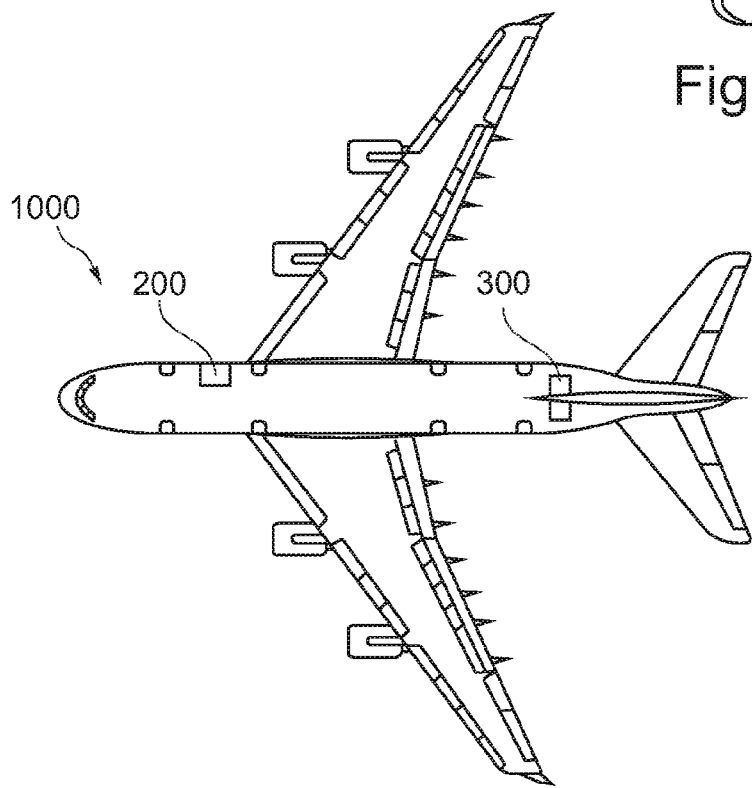
FIG. 10 shows an aircraft with a toilet module and a kitchen module according to an exemplary embodiment.

FIG. 10 shows an aircraft 1000 with one or more toilet modules 200 as well as one or more kitchen modules 300 according to an exemplary embodiment of the invention. Mobile hand washing basins may also be provided.

Figure 11:
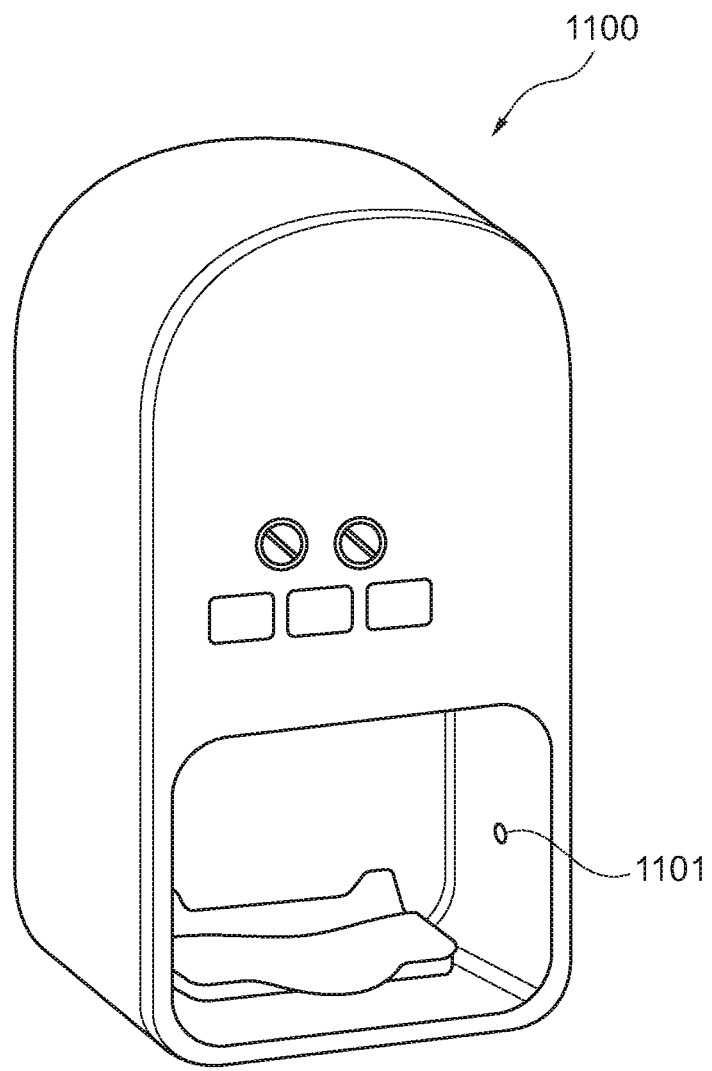
FIG. 11 shows a dispenser for dispensing an agent onto the user's hands.

FIG. 11 shows an automated dispenser 1100 for dispensing a sterilizing or sanitary agent onto the user's hands, which may be part of the washing stand. The agent may be sprayed onto the user's hands. The dispenser may also comprise one or more sensors 1101, so that the agent is dispensed when the user holds his or her hand under this agent dispenser. In particular, the agent dispenser may be positioned above the washing basing, so that excess agent drips into the basin. The dispenser 1100 may be integrated in the washing stand, for example into the water tap 105 or beside the water tap 105 (see FIG. 1). Thus, a four phase washing cycle may be performed in a fully or semi-automated manner. In a first phase or step, soap may be applied to the user's hands. In phase two, the hands are rinsed in the water ejected from water tap 105. Then, in phase three, the hands are dried by an airstream from the hand-drying device and in phase four, the agent is applied onto the user's hands.

Each of the four phases may be visualized by colored light emitted from a lighting arrangement, such as a LED or an LED array. For example, each phase may be correlated with a respective color, e.g. yellow for application of soap, blue for rinsing in water, red for drying, orange for disinfection/sterilization, green for successful completion of whole cleaning cycle. Of course, other colors may be used. Further, acoustic, and/or other visual or haptic signals may be used for guiding the user through the washing cycle.

In addition, let it be noted that "comprising" and "exhibiting" do not preclude other elements or steps, and "an" or "a" do not rule out a plurality. Let it further be noted that features or steps described with reference to one of the above exemplary embodiments can also be used in combination with other features or steps from other exemplary embodiments described above. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An interior fixture for an aircraft, comprising:
   a hand-drying device configured to generate an air stream; and
   a connection to an air supply line of the aircraft, which provides at least a portion of the air for the hand-drying device,
   wherein the hand-drying device further comprises a plurality of air outlets, which are integrated into a hand-washing basin, and through which the air stream is blown out.

2. The interior fixture of claim 1, further comprising:
   a compressor that is configured to recompress the at least a portion of the air provided by the air supply line of the aircraft.

3. The interior fixture of claim 1, further comprising:
   an additional air supply configured to provide additional air, which is mixed with the air provided by the air supply line of the aircraft.

4. The interior fixture of claim 1, wherein the interior fixture is a kitchen fixture.

5. An aircraft, comprising:
   an engine;
   an air supply line configured to bleed air from the engine;
   a hand-drying device configured to generate an air stream; and
   a connection configured to connect the hand-drying device to the air supply line of the aircraft, which provides at least a portion of the air for the hand-drying device,
   wherein the hand-drying device further comprises a plurality of air outlets, which are integrated into a hand-washing basin, and through which the air stream is blown out.

6. The aircraft of claim 5, further comprising:
   a cabin, wherein at least a portion of the air provided by the air supply line to the hand-drying device is air having a higher pressure than cabin air of the cabin.

7. The aircraft of claim 6, further comprising a lighting arrangement that is configured to:
   emit light of a first color when rinsing water is ejected from a washing stand; and
   emitting light of a second color when the hand-drying device is active.

8. The aircraft of claim 5, further comprising:
   a compressor that is configured to recompress the at least a portion of the air provided by the air supply line of the aircraft.

9. The aircraft of claim 5, further comprising:
   an additional air supply configured to provide additional air, which is mixed with the air provided by the air supply line of the aircraft.

10. The aircraft of claim 5, wherein the hand-drying device is a kitchen fixture.

11. The aircraft of claim 5,
    wherein at least two air outlets of the plurality of air outlets are situated across from each other to generate at least two streams of air flowing in opposite directions.

12. The aircraft of claim 5, further comprising:
    a first optical sensor configured to activate dispensing of water when detecting a hand at a first location of the hand-washing basin; and
    a second optical sensor configured to activate the hand-drying device when detecting the hand at a second location of the hand-washing basin.

13. The aircraft of claim 5, further comprising:
    an automated dispenser configured to dispense an agent into the hand-washing basin.

* * * * *